United States Patent
Koide et al.

(10) Patent No.: US 7,437,929 B2
(45) Date of Patent: Oct. 21, 2008

(54) LIQUID LEVEL DETECTOR

(75) Inventors: Shigeki Koide, Niigata (JP); Kiyoshi Enomoto, Niigata (JP); Tadao Nakagawa, Niigata (JP); Yoshiyuki Shimazaki, Niigata (JP); Yoshihiro Kamimura, Niigata (JP); Tetsuya Satoh, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 347 days.

(21) Appl. No.: 10/558,707

(22) PCT Filed: May 17, 2004

(86) PCT No.: PCT/JP2004/006624

§ 371 (c)(1),
(2), (4) Date: Nov. 29, 2005

(87) PCT Pub. No.: WO2004/106867

PCT Pub. Date: Dec. 9, 2004

(65) Prior Publication Data

US 2007/0006648 A1 Jan. 11, 2007

(30) Foreign Application Priority Data

May 30, 2003 (JP) ............................... 2003-154666

(51) Int. Cl.
*G01F 23/00* (2006.01)
(52) U.S. Cl. .............................. 73/313; 73/305; 73/317
(58) Field of Classification Search .................. 73/313, 73/305, 317
See application file for complete search history.

(56) References Cited

U.S. PATENT DOCUMENTS

| | | | | | |
|---|---|---|---|---|---|
| 5,341,679 | A | * | 8/1994 | Walkowski et al. | 73/317 |
| 5,746,088 | A | * | 5/1998 | Sawert et al. | 73/317 |
| 6,658,934 | B1 | * | 12/2003 | Housey et al. | 73/317 |
| 6,711,950 | B1 | * | 3/2004 | Yamaura et al. | 73/317 |
| 6,851,315 | B2 | * | 2/2005 | Bergsma et al. | 73/317 |
| 6,868,724 | B2 | * | 3/2005 | Brzozowski et al. | 73/317 |

FOREIGN PATENT DOCUMENTS

| | | |
|---|---|---|
| JP | 64-38534 | 3/1989 |
| JP | 2002-357473 | 12/2002 |

* cited by examiner

*Primary Examiner*—Hezron E. Williams
*Assistant Examiner*—Rodney T Frank
(74) *Attorney, Agent, or Firm*—McDermott Will & Emery LLP

(57) ABSTRACT

The present invention provides an inexpensive small-sized liquid level detector. A liquid level detector 1 includes a float moving in accordance with variations in liquid level, a hard circuit board 5, resistors 12a and 12b provided on the circuit board 5, a first sliding path 14 made of a plurality of electrodes 13 provided on the circuit board 5 and connected to the resistors 12a and 12b, and a first contact 6 coming into contact with the first sliding path 14, and the liquid level detector 1 outputs an electrical signal based on the resistances of the resistors 12a and 12b which are varied by the first contact 6 coming into contact with at least one of the plurality of electrodes 13 forming the first sliding path 14 in accordance with a variation of the float. A second sliding path 15 electrically connected to the first sliding path 14 is provided on the circuit board 5, a second contact 7 coming into contact with the second sliding path 14 is provided, and each of the first and second contacts 6 and 7 is electrically connected to an external circuit.

3 Claims, 3 Drawing Sheets

US 7,437,929 B2

LIQUID LEVEL DETECTOR

This application is the U.S. National Phase under 35 U.S.C. § 371 of International Application No. PCT/JP2004/006624, filed May 17, 2004, which in turn claims the benefit of Japanese Application No. 2003-154666, filed May 30, 2003, the disclosures of which Applications are incorporated by reference herein in their entirety.

TECHNICAL FIELD

The present invention relates to liquid level detectors and, more particularly, to inexpensive and small-sized liquid level detectors.

BACKGROUND ART

A conventional liquid level detector includes a float arm having a float floating on a liquid surface, an arm holder holding the float arm and having a rotational supporting point for the float arm, a frame bearing the rotational support point of the arm holder, a hard wiring board fixed to the frame, a contact holding member having a sliding contact sliding on the hard wiring board and fixed to the arm holder, and a terminal electrically connected to an electrode formed on the hard wiring board (refer to JP 2002-357473 A, for example).

However, the conventional liquid level detector is provided with a land for connecting the terminal to the hard wiring board made of ceramics. Because the land is necessary, the area of the hard wiring board cannot be reduced. In addition, the hard wiring board is formed by producing a plurality of circuit boards from a large board, but since the wiring board is large in area, it is impossible to manufacture many wiring boards from a large board, so that costs cannot be reduced.

The invention has been made in view of this problem and a main object of the invention is to provide an inexpensive and small-sized liquid level detector.

DISCLOSURE OF THE INVENTION

To achieve the above object, the invention provides a liquid level detector which includes a float moving in accordance with variations in liquid level, a hard circuit board, resistors provided on the circuit board, a first sliding path made of a plurality of electrodes provided on the circuit board and connected to the resistors, and a first contact coming into contact with the first sliding path, and the liquid level detector outputs an electrical signal based on resistances of the resistors which are varied by the first contact coming into contact with at least one of the plurality of electrodes forming the first sliding path in accordance with a variation of the float. A second sliding path electrically connected to the first sliding path is provided on the circuit board, a second contact coming into contact with the second sliding path is provided, and each of the first and second contacts is electrically connected to an external circuit.

The liquid level detector further includes a float arm having the float at one end, an arm holder holding the float arm, and a frame rotatably supporting the float arm. The circuit board is provided on the frame, and the first and second contacts are provided on the arm holder.

The liquid level detector further includes a float arm having the float at one end, an arm holder holding the float arm, and a frame rotatably supporting the float arm. The circuit board is provided on the arm holder, and the first and second contacts are provided on the frame.

BEST MODE FOR CARRYING OUT THE INVENTION

Figure 1:
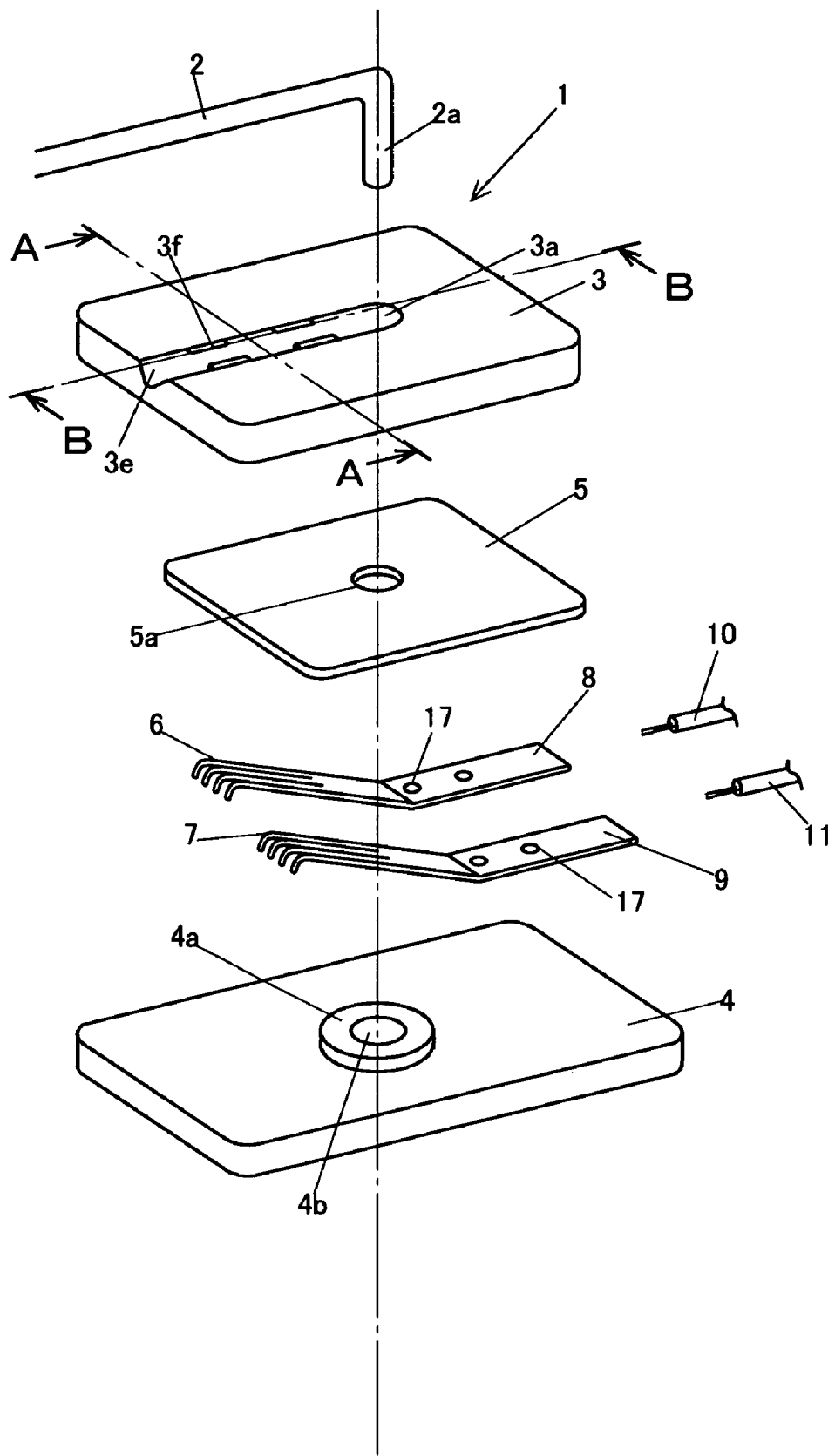
FIG. 1 is an exploded perspective view of a first embodiment of the invention.
Figure 2:
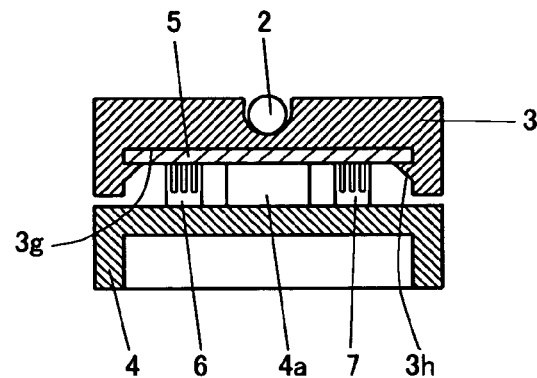
FIG. 2 is a cross-sectional view taken along line A-A of FIG. 1.
Figure 3:
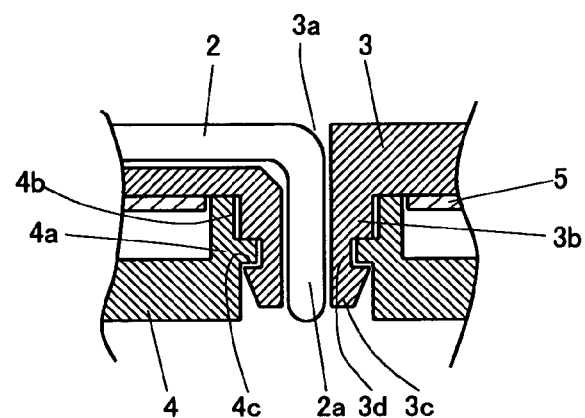
FIG. 3 is a cross-sectional view taken along line B-B of FIG. 1.
Figure 4:
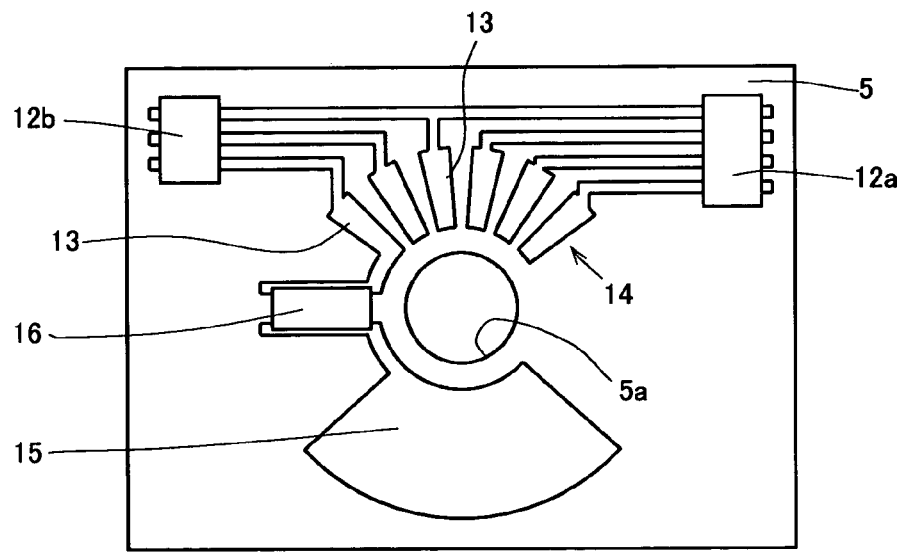
FIG. 4 is a front view of a circuit board of the same embodiment.

A first embodiment of the present invention will be described below with reference to the accompanying drawings. A liquid level detector 1 according to the present embodiment includes a float (not shown) moving in accordance with variations in liquid level, a float arm 2 having the float at one end, an arm holder 3 holding the float arm 2, and a frame 4 rotatably supporting the float arm 2. The arm holder 3 is provided with a circuit board 5, and terminals 8 and 9 respectively having first and second contacts 6 and 7 are provided on the frame 4. Lead wires 10 and 11 are respectively fixed to the terminals 8 and 9 in order to electrically connect the terminals 8 and 9 to an external circuit (not shown).

The float arm 2 is a metal-made wire having rigidity and has the float at one end, and has a shaft section 2a formed by bending at the other end. The shaft section 2a forms a shaft about which the float arm 2 rotates.

The arm holder 3 is made of a synthetic resin, and holds the float arm 2 and the circuit board 5. The arm holder 3 has a hole 3a through which the shaft section 2a of the float arm 2 is inserted. The arm holder 3 also has a cylindrical section 3b at its back (at a position invisible in FIG. 1) so as to correspond to the hole 3a. Three elastic parts 3d each having a claw section 3c are provided at the tip of the cylindrical section 3b. The elastic parts 3d each having the claw section 3c serves to rotatably mount the arm holder 3 to the frame 4.

A groove 3e extending from the hole 3a is formed at the top of the arm holder 3. The float arm 2 is fitted into the groove 3e. A plurality of, in the embodiment, four, claws 3f are formed along the edges of the groove 3e. The claws 3f serve to fix the float arm 2 to the arm holder 3. The float arm 2 and the arm holder 3 are reliably fixed to each other by the groove 3e and the claws 3f. In addition, the groove 3e and the claws 3f of the embodiment are not limitative, and the invention may use appropriate means capable of reliably fixing the float arm 2 and the arm holder 3.

The frame 4 is made of a synthetic resin and, in the embodiment, is formed of the same material as the arm holder 3. The frame 4 is fixed to a mounting member such as a stay provided for fixing the liquid level detector 1 in a fuel tank. A cylindrical projecting section 4a having a through hole 4b at the center is provided on the frame 4 so that the arm holder 3 is rotatably mounted. A step section 4c formed by reducing the diameter of the through hole 4b is provided in the inside of the through hole 4b so that the claw section 3c of the arm holder 3 is engaged.

A method of fixing the float arm 2 and the arm holder 3 as well as the frame 4 will be described below. First, the elastic parts 3d having the claw section 3c of the arm holder 3 are inserted through the through hole 4b of the frame 4 before the float arm 2 is mounted to the arm holder 3. Then, as the claw section 3c moves into the step section 4c having a small diameter, the elastic parts 3d are deformed, so that the claw section 3c can be inserted into the inside of the step section 4c. Then, when the claw section 3c moves through the step section 4c in the through hole 4b, the elastic parts 3d are restored from deformation and the claw section 3c engages with the step section 4c. Then, the shaft section 2a of the float arm 2 is inserted into the hole 3a of the arm holder 3 and the float arm 2 is fixed by the claws 3f of the arm holder 3. In this manner, the fixation of the float arm 2 and the arm holder 3 as well as the frame 4 is completed. At this time, by inserting the shaft section 2a of the float arm 2 into the hole 3a of the arm holder 3, it is possible to prevent the deformation of the elastic parts 3d of the arm holder 3, and in turn, it is possible to prevent the claw section 3c of the arm holder 3 from coming off the step section 4c of the frame 4.

The circuit board 5 is a hard circuit board, and uses ceramics in the embodiment. A through hole 5a is formed in the central section of the circuit board 5. The cylindrical section 3b of the arm holder 3 and the projecting section 4a of the frame 4 are inserted through the through hole 5a. The circuit board 5 is housed in a hollow section 3g formed in the arm holder 3, and is fixed to the arm holder 3 by claws 3h provided at the periphery of the hollow section 3g.

Two resistors 12a and 12b are provided on the circuit board 5. The resistors 12a and 12b are made of ruthenium oxide or the like, and a plurality of electrodes 13 connected to the resistors 12a and 12b are provided. The electrodes 13 are formed of a silver-palladium alloy or the like. The electrodes 13 are independent from one another, and are connected to one another by the resistors 12a and 12b. In addition, the plurality of electrodes 13 are partially grouped to form a first sliding path 14.

An electrode 15 which serves as a second sliding path electrically connected to the first sliding path 14 is formed on the circuit board 5. The electrode 15 is also formed of the same material as the electrodes 13. In the embodiment, a resistor 16 is provided between the first sliding path 14 and the second sliding path 15. The resistor 16 is also formed of the same material as the resistors 12a and 12b.

The first contact 6 which will be described later in detail is in contact with the first sliding path 14, while the second contact 7 which will be described later in detail is in contact with the second sliding path 15.

The first and second contacts 6 and 7 are respectively formed at the terminals 8 and 9. The terminals 8 and 9 have plate-like shapes, and in the embodiment, their material is made of nickel silver. Each of the first and second contacts 6 and 7 has a plurality of, in the embodiment, four, contact points. The first and second contacts 6 and 7 are respectively bent upwardly as viewed in FIG. 1 from the middle of the terminals 8 and 9 so that the first and second contacts 6 and 7 can be brought into good contact with the first and second sliding paths 14 and 15. The extending ends of the respective first and second contacts 6 and 7 are bent downwardly as viewed in FIG. 1 so that the first and second contacts 6 and 7 can slide good the first and second sliding paths 14 and 15.

The terminals 8 and 9 are fixed to the frame 4 by providing through holes 17 in each of the terminals 8 and 9, providing pins (not shown) to be inserted through the through holes 17 on the frame 4, and deforming by heat the pins inserted through the through holes 17.

As mentioned previously, the lead wires 10 and 11 are respectively fixed to the terminals 8 and 9 in order to electrically connect the terminals 8 and 9 to the external circuit. The connection between the terminals 8 and 9 and the lead wires 10 and 11 may use solder, or may be realized by caulking the terminals 8 and 9.

In the liquid level detector 1 constructed in the above-mentioned manner, the float arm 2 and the arm holder 3 rotate in accordance with variations of the float. Accordingly, the circuit board 5 fixed to the arm holder 3 rotates. During this rotation, the first contact 6 comes into contact with at least one of the plurality of electrodes 13 forming the first sliding path 14. In this manner, the liquid level detector 1 outputs an electrical signal based on varied resistances of the resistors 12a and 12b to the external circuit.

The electrical connection of the embodiment is formed by the lead wire 10, the first contact 6 (the terminal 8), the electrodes 13 (the first sliding path 14), the resistors 12a and 12b (provided that the resistors 12a and 12b may be omitted depending on the position where the first contact 6 comes into contact with the first sliding path 14), the electrodes 13, the resistor 16, the second sliding path 15, the second contact 7 (the terminal 9) and the lead wire 11.

As described above, since the first and second contacts 6 and 7 are electrically connected to the external circuit, it is possible to omit a land for connecting a terminal to the external circuit, which would have been provided on the circuit board 5, and in turn, it is possible to miniaturize the circuit board 5, so that it is possible to provide a small-sized liquid level detector. In addition, since it is possible to miniaturize the circuit board 5, it is possible to obtain a larger number of circuit boards 5 from one large board, so that it is possible to reduce costs.

In addition, members which connect the first and second contacts 6 and 7 to the external circuit are not limited to the lead wires 10 and 11, and in the invention, since the first and second contacts 6 and 7 are fixed to the frame 4, such member may also be fixed electrical connection members such as connectors provided on the fuel tank.

Figure 5:
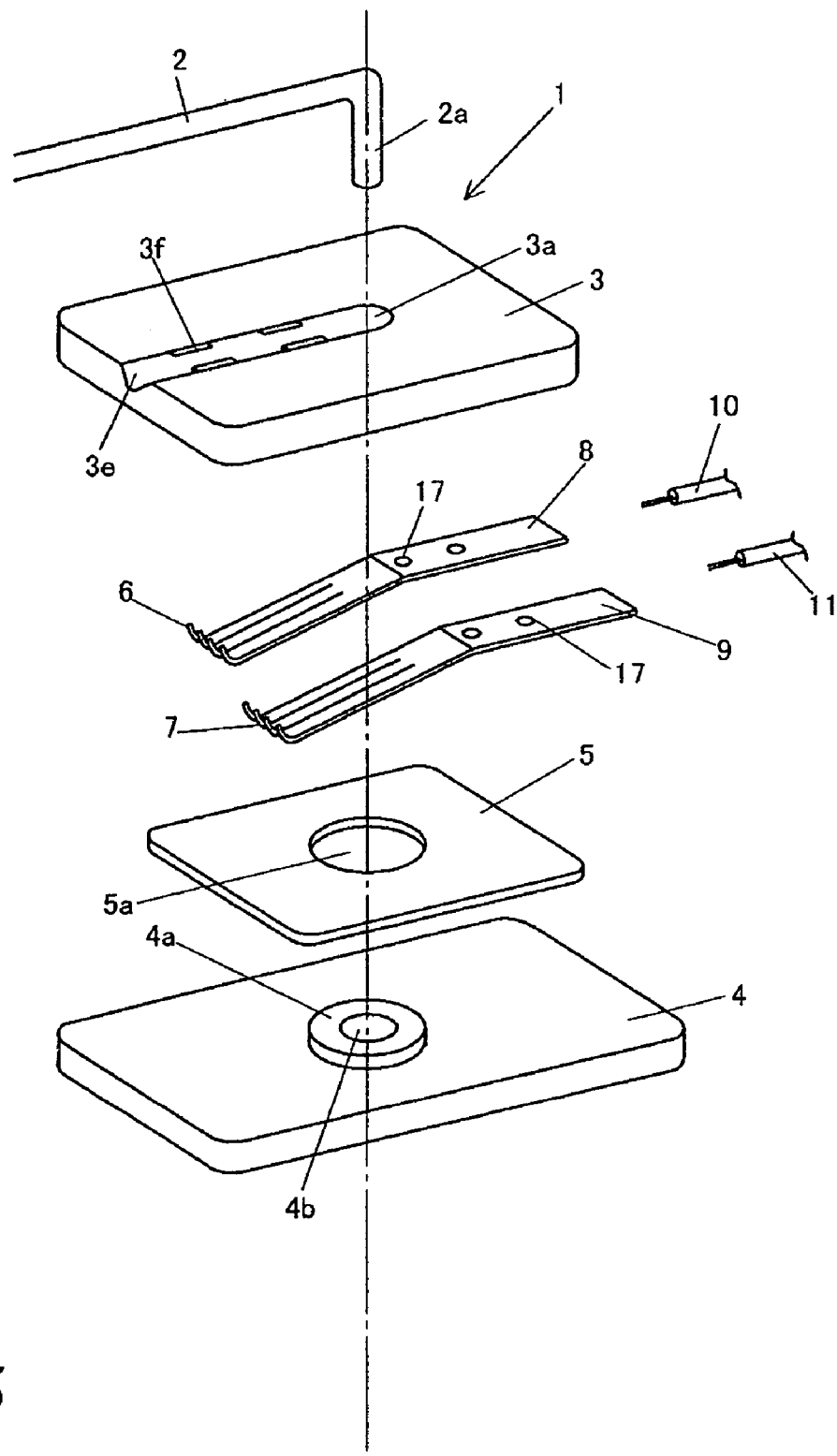
FIG. 5 is an exploded perspective view of another embodiment of the invention.

In the embodiment, the arm holder 3 is fixed to the circuit board 5 and the terminals 8 and 9 having the first and second contacts 6 and 7 are provided on the frame 4, but the embodiment is not limitative. In another modified embodiment shown in FIG. 5, the circuit board 5 may be fixed to the frame 4 and the terminals 8 and 9 having the first and second contacts 6 and 7 may be provided on the arm holder 3. In the case of this construction, since the rotatable arm holder 3 has the first and second contacts 6 and 7, it is impossible to connect the first and second contacts 6 and 7 to the fixed electrical connection members such as the connectors provided on the fuel tank as in the first embodiment, but this point may be coped with by electrical connection members having flexibility, such as lead wires. Accordingly, apart from this point, it is possible to obtain advantages and effects similar to those of the first embodiment.

INDUSTRIAL APPLICABILITY

The invention can be applied to liquid level detectors, and is particularly suitable for realizing inexpensive and small-sized liquid level detectors.

The invention claimed is:

1. A liquid level detector comprising a float moving in accordance with variations in liquid level, a hard circuit board, resistors provided on the circuit board, a first sliding path made of a plurality of electrodes provided on the circuit board and connected to the resistors, and a first contact coming into contact with the first sliding path, the liquid level detector outputting an electrical signal based on resistances of the resistors which are varied by the first contact coming into contact with at least one of the plurality of electrodes forming the first sliding path in accordance with a variation of the float, a second sliding path electrically connected to the first sliding path being provided on the circuit board, and a second contact coming into contact with the second sliding path being provided, wherein each of the first and second contacts are directly electrically connected to an external circuit, and the circuit board is not directly electrically connectible to an external circuit.

2. A liquid level detector according to claim 1, further comprising a float arm having the float at one end, an arm holder holding the float arm, and a frame rotatably supporting the float arm, the circuit board being provided on the frame, and the first and second contacts being provided on the arm holder.

3. A liquid level detector comprising a float moving in accordance with variations in liquid level, a hard circuit board, resistors provided on the circuit board, a first sliding path made of a plurality of electrodes provided on the circuit board and connected to the resistors, and a first contact coming into contact with the first sliding path, the liquid level detector outputting an electrical signal based on resistances of the resistors which are varied by the first contact coming into contact with at least one of the plurality of electrodes forming the first sliding path in accordance with a variation of the float, a second sliding path electrically connected to the first sliding path being provided on the circuit board, a second contact coming into contact with the second sliding path being provided, and each of the first and second contacts being electrically connected to an external circuit;

further comprising a float arm having the float at one end, an arm holder holding the float arm, and a frame rotatably supporting the float arm, the circuit board being provided on the arm holder, and the first and second contacts being provided on the frame.

* * * * *